United States Patent
Niehr et al.

(10) Patent No.: US 10,968,048 B2
(45) Date of Patent: Apr. 6, 2021

(54) DEVICE AND METHOD FOR GROUPED FEEDING OF CONTAINERS TO A CYCLICAL PROCESSING MACHINE

(71) Applicant: KHS GmbH, Dortmund (DE)

(72) Inventors: Thomas Niehr, Bad Münster am Stein Ebernburg (DE); Igor Singur, Bad Kreuznach (DE); Jürgen Franz Vorwerk, Bad Kreuznach (DE)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 16/763,069

(22) PCT Filed: Oct. 17, 2018

(86) PCT No.: PCT/EP2018/078405
§ 371 (c)(1),
(2) Date: May 11, 2020

(87) PCT Pub. No.: WO2019/096527
PCT Pub. Date: May 23, 2019

(65) Prior Publication Data
US 2020/0346879 A1 Nov. 5, 2020

(30) Foreign Application Priority Data

Nov. 20, 2017 (DE) ...................... 10 2017 127 322.0

(51) Int. Cl.
*B65G 47/84* (2006.01)
*B65G 47/86* (2006.01)
(Continued)

(52) U.S. Cl.
CPC ......... *B65G 47/842* (2013.01); *B65G 47/082* (2013.01); *B65G 47/32* (2013.01);
(Continued)

(58) Field of Classification Search
CPC .... B65G 47/082; B65G 47/32; B65G 47/715; B65G 47/842; B65G 47/847;
(Continued)

(56) References Cited

U.S. PATENT DOCUMENTS 7,624,856 B2 * 12/2009 Monti ................ B65G 47/5113
198/419.3
8,002,106 B2 * 8/2011 Preti .................... B65G 47/847
198/459.2
(Continued)

FOREIGN PATENT DOCUMENTS

DE 102004036063 A1 2/2006
DE 102011075171 A1 11/2012
(Continued)

*Primary Examiner* — Gene O Crawford
*Assistant Examiner* — Keith R Campbell
(74) *Attorney, Agent, or Firm* — Occhiuti & Rohlicek LLP

(57) ABSTRACT

An apparatus for grouped take-up and feeding of a container-group of containers to a cyclical processing machine having a cyclical take-up device for taking up the group of containers includes an intake, a feed, and a transfer apparatus arranged in a transfer region between the intake and the take-up device. The intake forms a closed conveyor section that comprises a linear section, a conveyor, and carrying-and-holding elements that convey containers in a continuous container stream along the conveyor section. The feed uses mechanical propulsion to convey suspended containers to individually transfer the suspended containers to the carrying-and-holding elements. The transfer apparatus has rotatable grippers for taking up a container group from the container stream and after having taken up the group of containers, feeding the group of containers to the cyclical take-up device.

20 Claims, 14 Drawing Sheets

(51) Int. Cl.
  *B65G 47/08* (2006.01)
  *B65G 54/02* (2006.01)
  *B65G 47/32* (2006.01)
  *B65G 47/90* (2006.01)
(52) U.S. Cl.
  CPC ......... *B65G 47/847* (2013.01); *B65G 47/907* (2013.01); *B65G 54/02* (2013.01); *B65G 47/908* (2013.01); *B65G 2201/0244* (2013.01); *B65G 2201/0247* (2013.01)
(58) Field of Classification Search
  CPC .. B65G 47/904; B65G 47/907; B65G 47/908; B65G 47/918; B65G 54/02; B65G 2201/0244; B65G 2201/0247
  See application file for complete search history.

(56) References Cited

U.S. PATENT DOCUMENTS

| | | | | |
|---|---|---|---|---|
| 9,809,392 | B2 * | 11/2017 | Walter | B65G 37/02 |
| 10,167,143 | B2 * | 1/2019 | Senn | B65G 54/02 |
| 10,363,697 | B2 * | 7/2019 | Lahogue | B29C 49/4215 |
| 10,597,239 | B2 * | 3/2020 | Eusebione | B65G 47/082 |
| 10,766,650 | B2 * | 9/2020 | Choplin | B65B 53/063 |
| 2008/0032059 | A1 * | 2/2008 | Zimmerer | A61L 2/14 427/458 |
| 2018/0141688 | A1 * | 5/2018 | Choplin | B65B 35/26 |

FOREIGN PATENT DOCUMENTS

| | | |
|---|---|---|
| DE | 102013106742 | * 12/2014 |
| DE | 102013218403 A1 | 3/2015 |
| EP | 1958898 A1 | 8/2008 |
| FR | 3035651 A1 | 11/2016 |
| JP | H05116746 A | 5/1993 |
| JP | 2012031454 A | 2/2012 |
| WO | 0249829 A1 | 6/2002 |
| WO | 2015036196 A2 | 3/2015 |
| WO | 2016177964 A1 | 11/2016 |
| WO | 2017179022 A2 | 10/2017 |

* cited by examiner

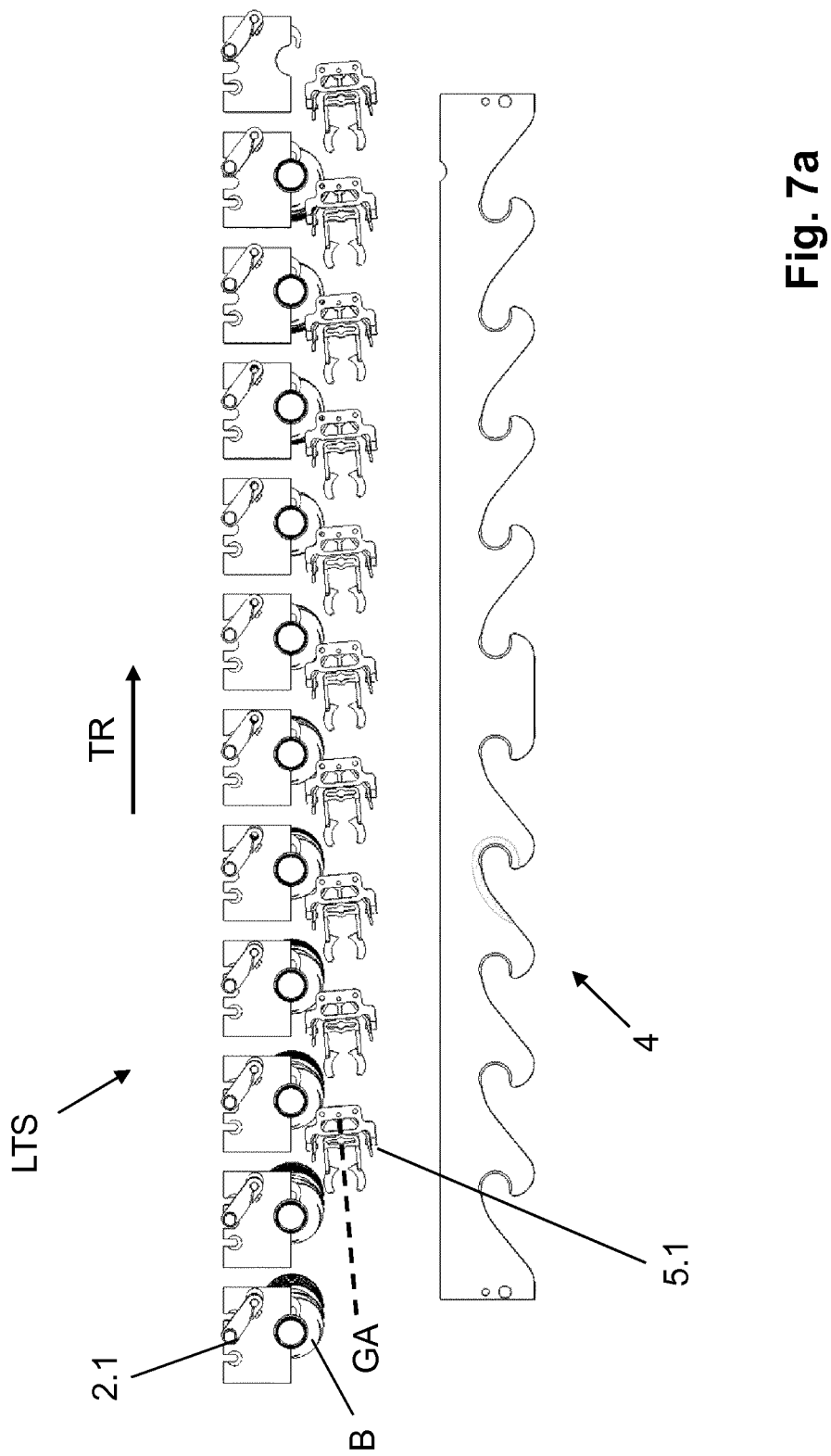

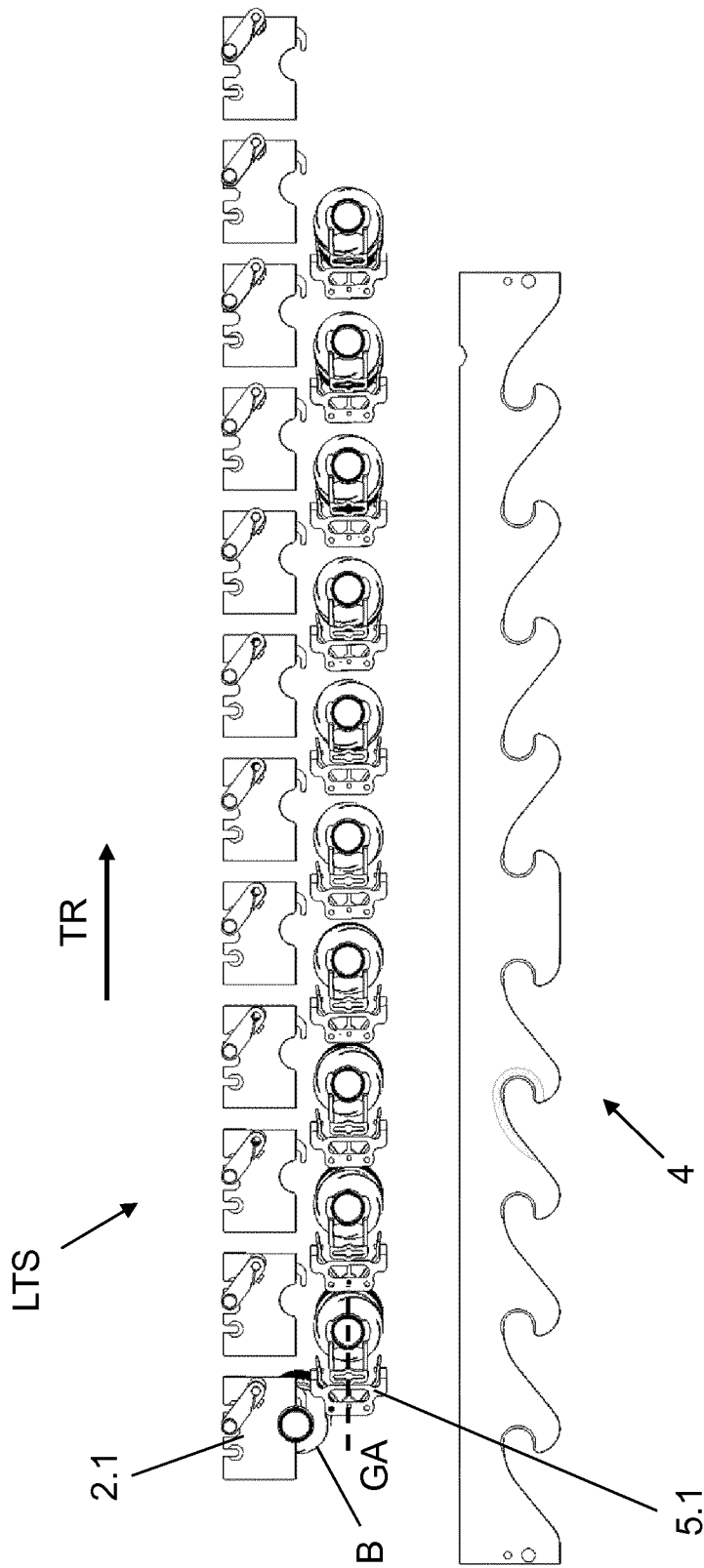

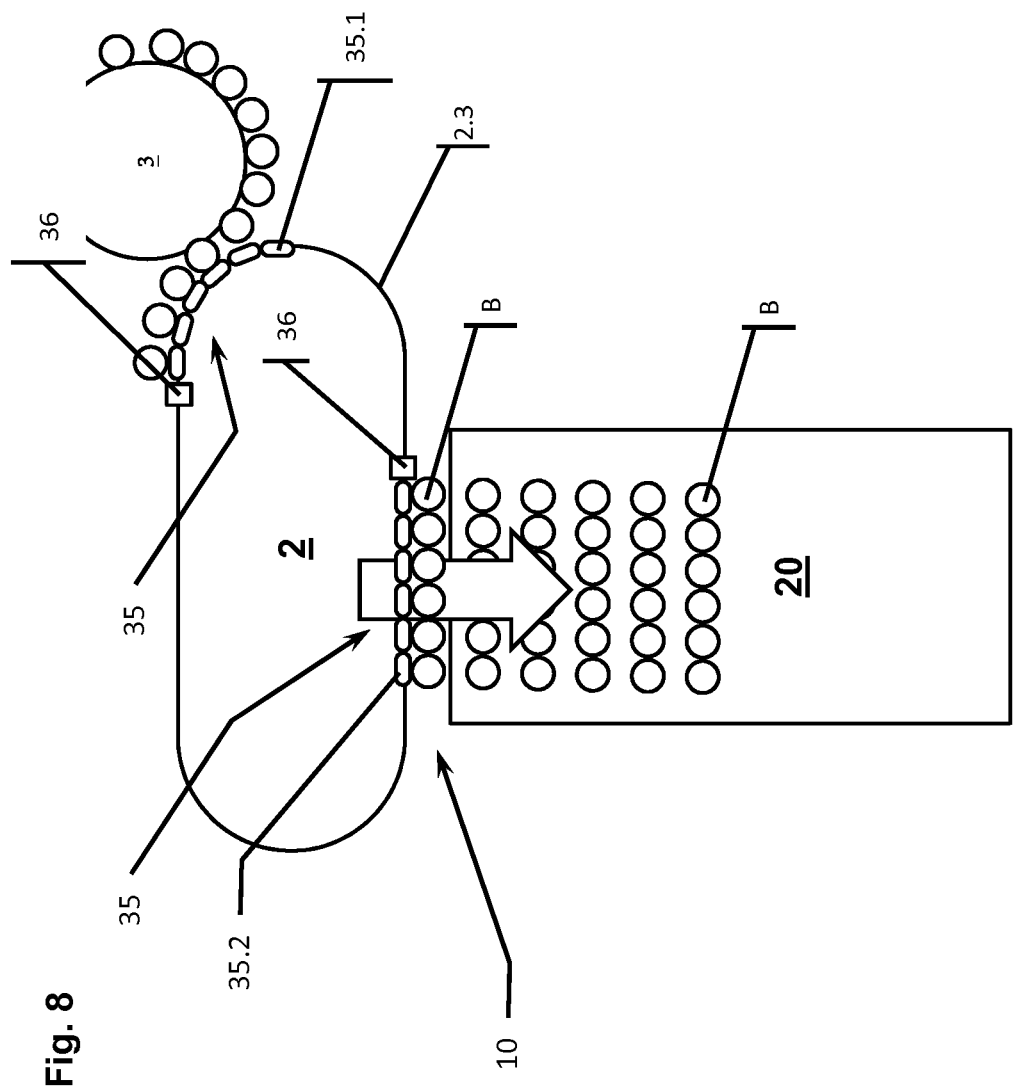

DEVICE AND METHOD FOR GROUPED FEEDING OF CONTAINERS TO A CYCLICAL PROCESSING MACHINE

RELATED APPLICATIONS

This is the national stage of international application PCT/EP2018/078405, which claims the benefit of the Nov. 20, 2017 priority date of German application 10 2017 127 322.0, the contents of which are herein incorporated by reference.

FIELD OF INVENTION

The invention relates to a device and associated method for the grouped feeding of containers to a cyclical processing machine.

BACKGROUND

In a filling installation, it is usual to have a stream of containers. This stream is often a narrow one, with only one row of containers.

Some container-processing machines accept containers in groups rather than one at a time.

To accommodate these container-processing machines, some way must exist to turn a stream of containers into a container group that can be fed in parallel. This would be a mechanical analog to a serial-to-parallel converter.

SUMMARY

Taking this as a basis, the object of the present invention is to provide a device and an associated method for the grouped feeding of containers to a cyclical processing machine, by means of which the individual containers can be conveyed suspended, via an intake device, along a conveyor section to the cyclical processing machine.

An important aspect of the device according to the invention is to be seen in that the grippers of the transfer apparatus are configured for taking up the containers of the group of containers, moved along the conveyor section portion, such as to rotate or pivot about a vertical axis of rotation. Particularly advantageously, as a result of the rotating or pivoting configuration of the grippers of the transfer apparatus, the take-up or transfer respectively of the containers can be adjusted to the continuous, i.e. non-interrupted, conveying movement of the containers, i.e. the gripper opening of the grippers can be pivoted into the moved continuous container stream without any interference, in such a way that a simultaneous take-up of a group of containers from the moved container stream is possible without any problem.

In this context, the expression "continuous container stream" in the region of the intake device is understood to be a container stream which may indeed be fed to the intake device by means of a feed device permanently and free of interruption, with a speed which, as a rule, very largely remains constant, but which, in or at the intake device can undergo a division into part groups. In this situation, these part groups can be moved in or at the intake device at different speeds.

To further advantage, the grippers of the transfer apparatus are configured for gripping the containers at or above a container neck, or, with containers formed by PET bottles, at or above a neck ring of a PET bottle. As a result, the grippers of the transfer apparatus can be of simpler configuration, for example as a closable cut-out opening of a holding plate element, wherein the grippers of the transfer apparatus comprise at least two gripping arms, by means of which it is also possible to hold the containers by force-fit or non-positive fit in the region of the container neck or the neck ring.

Preferably, the grippers of the transfer apparatus can be rotated or pivoted in synchrony with one another, wherein, for example, for this purpose a common drive device is provided, by means of which the grippers of the transfer apparatus are connected with regard to their drive in order to produce a synchronous rotational or pivoting movement of the grippers about the respective axis of rotation. The grippers of the transfer apparatus comprise, for example, two mutually opposed gripper arms, of which the free end regions enclose a gripper opening for inserting and holding the container neck between the two gripper arms. The grippers of the transfer apparatus further comprise a gripper opening axis, which extends from the axis of rotation perpendicular and radially outwards between the two gripper arms, over the gripper opening.

To further advantage, the rotation or the pivoting of the grippers of the transfer apparatus is adjusted to the linear conveying movement of the containers in the linear conveyor section portion, and specifically in such a way that interference-free pivoting of the gripper opening inwards to take up the container neck or neck ring is ensured.

In a particularly preferred embodiment variant, the grippers of the transfer apparatus are arranged parallel to and at a distance from the linear conveyor section portion, wherein in each case a gripper of the transfer apparatus is provided for taking up a container from a gripper of the intake device.

For further preference, the carrying and holding elements of the intake device are held by an endlessly circulating transport element, and project sideways outwards from the conveyor section. To particular advantage, the conveyor element can be formed by a conveyor chain or a conveyor rail with associated carriage elements or drawing module, wherein the grippers are secured to the chain links or the carriage elements.

Further, a number of conveying modules can be provided which can be controlled and driven mutually independently. A drawing module in this situation comprises a number of carrying and holding elements which corresponds to the number of the containers or group of containers which must be transferred in the specified operating mode cyclically into the processing machine.

Likewise the object of the invention is a method for the grouped take-up and feeding of a group of containers to a cyclical processing machine, in particular a filling machine, comprising an intake device, a feed device, and at least one cyclical take-up device for taking up the group of containers, with which a continuous container stream is fed via the feed device of the intake device, which forms an endlessly circulating conveyor section with at least one, preferably linear, conveyor section portion, wherein the containers are conveyed along the conveyor section suspended from a plurality of carrying and holding elements. Particularly advantageously, by means of a transfer apparatus comprising a plurality of rotatable or pivotable grippers, the containers are taken up in the form of a group of containers from the continually moved container stream in a transfer region between the intake device and the take-up device, group by group, and the containers which are taken up are fed in groups to the cyclical take-up device, wherein, for the grouped take-up of the containers, the rotation or pivot movement of the grippers of the transfer apparatus of the conveyor device is adjusted to the conveying movement of the containers along the conveyor section portion. To particular advantage, in this situation the grippers are rotated or pivoted in synchrony with one another.

Further advantageously, at the transfer from the intake device to the cyclical take-up device, the carrying and holding elements are moved continuously along the conveyor section, i.e. the conveying movement as such is not interrupted or stopped; rather, the intake device is continually operated.

In one aspect, the invention features an apparatus for grouped take-up and feeding of a group of containers to a cyclical processing machine having a cyclical take-up device for taking up the group of containers. Such an apparatus includes an intake, a feed, and a transfer apparatus that is arranged in a transfer region between the intake and the take-up device. The intake forms a closed conveyor section that comprises a linear section, a conveyor, and carrying-and-holding elements. The carrying-and-holding elements cooperate to convey containers in a continuous container stream along the conveyor section. The feed uses mechanical propulsion to convey suspended containers to individually transfer the suspended containers to the carrying-and-holding elements. The transfer apparatus comprises grippers for taking up a group of containers from the continuous container stream at the linear section and after having taken up the group of containers, feeding the group of containers to the cyclical take-up device. Each of the grippers rotates about a vertical axis-or-rotation thereof.

The expression "essentially" or "approximately" signifies in the meaning of the invention deviations from the exact value in each case by +/−10%, preferably by +/−5%, and/or by deviations in the form of changes which are not of significance with regard to the function.

As used herein, "mechanical" propulsion or conveyance of containers is to be regarded as excluding conveyance by blowing air against the containers to propel them.

As used herein, the meaning of "to rotate" includes the meaning of "to pivot."

Further embodiments, advantages, and possible applications of the invention also derive from the following description of exemplary embodiments and from the Figures. In this situation, all the features described and/or represented in the images are in principle the object of the invention, individually or in any desired combination, regardless of their relationship in the claims or reference to them. The contents of the claims are also made constituent parts of the description.

BRIEF DESCRIPTION OF THE DRAWINGS

The invention is described in greater detail hereinafter on the basis of the figures in relation to exemplary embodiments. The figures show:

FIGS. 7a-7f are top views of the transfer device at different stages of a transfer;

FIG. 8 shows an apparatus similar to that in FIG. 1 but having freely controllable drawing modules.

For elements of the invention which are the same or have the same effect, identical reference numbers are used in the Figures. In addition, for easier overview, only reference numbers are represented in the individual FIGS which are required for the description of the respective FIG.

DETAILED DESCRIPTION

Figure 1:
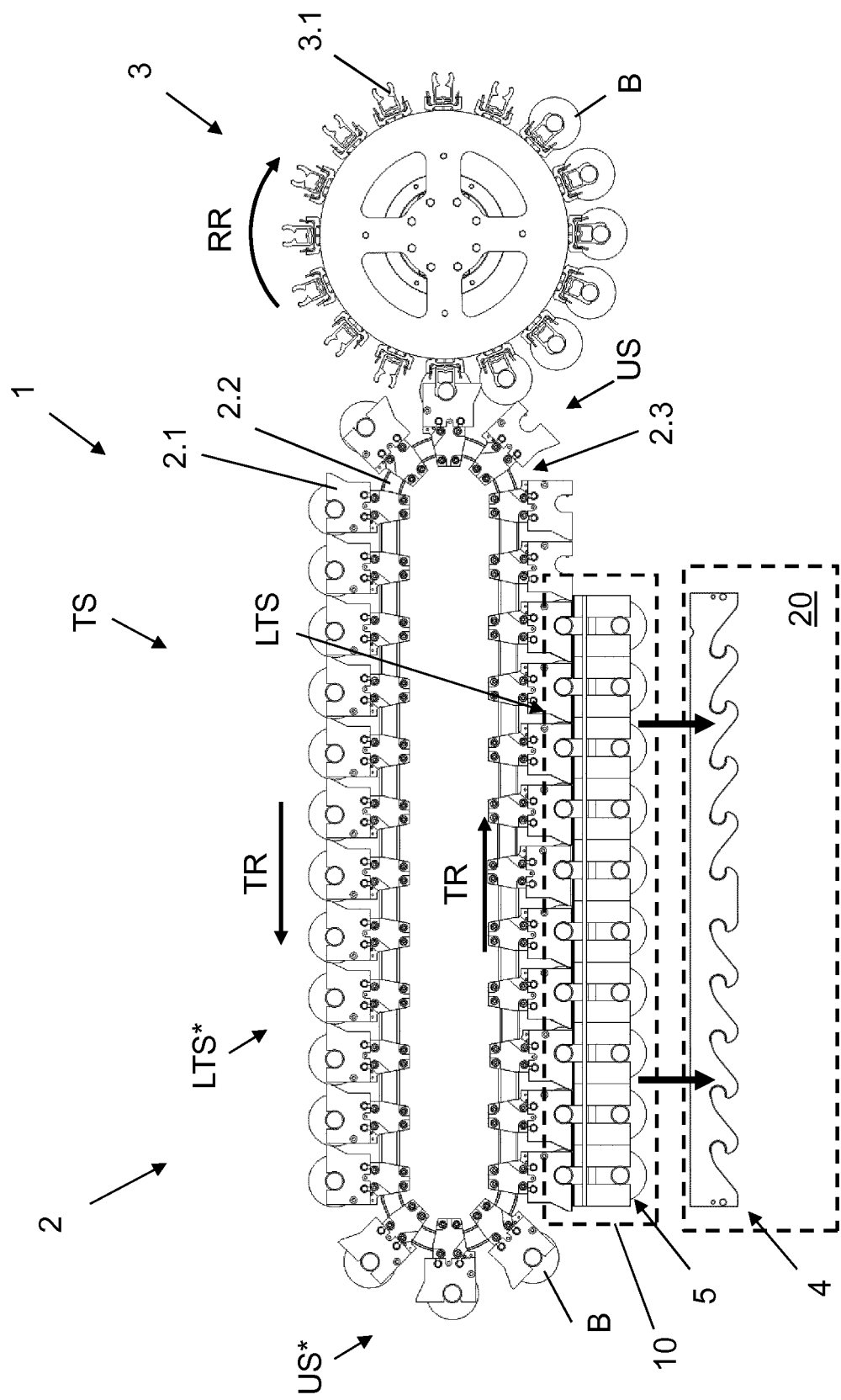
FIG. 1 is a top view of an apparatus that takes up and feeds a container group to a cyclical processing machine.

FIG. 1 shows a feeding apparatus 1 that feeds containers B to a cyclical processing machine 20, the details of which are omitted and replaced by a dashed line. The apparatus 1 is typically either upstream of the cyclical processing machine 20 or a constituent of the cyclical processing machine 20.

An example of a cyclical processing machine 20 is a filling machine that fills groups of containers B. Among these are linear fillers. A linear filler receives a group of containers B equally-spaced along a line with their container axes being parallel to each other.

The feeding apparatus 1 features an intake 2, a rotating feed 3, and a linear cyclical take-up device 4.

The take-up device 4 takes up a group of containers B. A transfer apparatus 5, which is arranged in a transition region 10 between the intake 2 and the take-up device 4, transfers a group of containers B from the intake 2 to the take-up device 4.

The intake 2 forms an endlessly circulating conveying oval path TS that has opposed and parallel first and second linear sections LTS*, LTS. Corresponding first and second deflection sections US, US* connect the linear sections LTS*, LTS to form an oval path.

The intake 2 includes carrying-and-holding elements 2.1 that suspend containers B by their neck rings. An endlessly circulating conveyor 2.2 holds the carrying-and-holding elements 2.1 so that they project outwards from the conveyor section TS.

In some embodiments, the conveyor 2.2 is configured as a conveyor chain having chain links. In other embodiments, the conveyor 2.2 includes a conveyor rail 2.3 that guide associated carriages.

Figure 2:
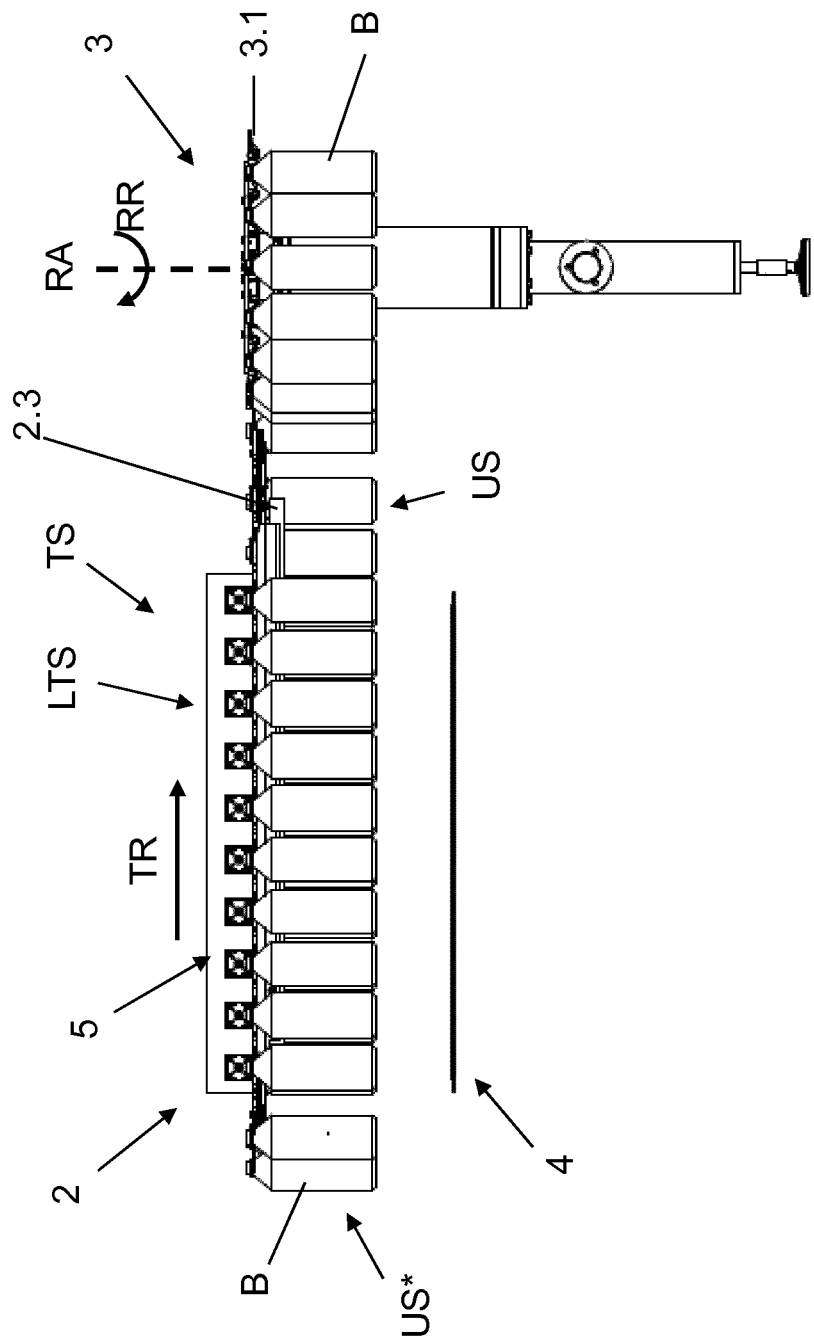
FIG. 2 is a side view of the apparatus shown in FIG. 1.

A carrying-and-holding element 2.1 is mounted on each such carriage. In some embodiments, the carrying-and-holding elements 2.1 are secured to chain links in a releasable manner. As shown in FIG. 2 and in FIGS. 7a-7f, the carrying-and-holding elements 2.1 are isolated from the conveyor 2.2

The embodiment shown in FIG. 1 has only one conveyor 2.2. Thus, all carrying-and-holding elements 2.1 and their accompanying containers B move together. As can be seen in FIGS. 2 to 5, each carrying-and-holding element 2.1 engages a container B at its neck. Typically, the container B is a PET bottle that has a neck ring for this purpose.

The rotating feed 3 transfers containers B to the intake 2, and in particular, to the carrying-and-holding elements 2.1. The illustrated rotating feed 3 is a star having grippers 3.1 that grip containers by their neck rings and convey the suspended containers B about its axis RA in a rotation direction RR from an intake region to an outlet region. At the outlet region, the grippers 3.1 transfer the containers B to corresponding carrying-and-holding elements 2.1. These carrying-and-holding elements 2.1 are also formed as grippers. To achieve an interference-free transfer, the feeder's rotation speed matches that of the intake 2.

The containers thus transferred eventually reach the second linear section LTS. At the second linear section LTS, the transfer apparatus 5 takes up a group of containers B.

The transfer apparatus 5 includes grippers 5.1. Each such gripper 5.1 picks up a containers B of a container group and transfers the containers B to the cyclical take-up device 4. The gripper 5.1 is configured to rotate or pivot about its vertical axis DA. As a result, the gripper 5.1 rotates synchronously with a container's linear movement as that container moves along the intake 2.

In operation, as a moving carrying-and-holding element 2.1 conveys a container B along the second linear section LTS, a gripper 5.1 engages it by the neck and pivots it out of the second linear section LTS, thus disengaging it from the carrying-and-holding element 2.1. This take-up occurs over a rotation angle that is less than 180°.

Each gripper 5.1 includes two mutually opposed arms. Each arm has a free end. Together, the free ends define an opening into which a container's neck can be introduced. As shown in FIG. 7a, the gripper's arms extend symmetrically along either side of an opening axis GA. The opening axis GA is perpendicular to the vertical axis DA.

Figure 4:
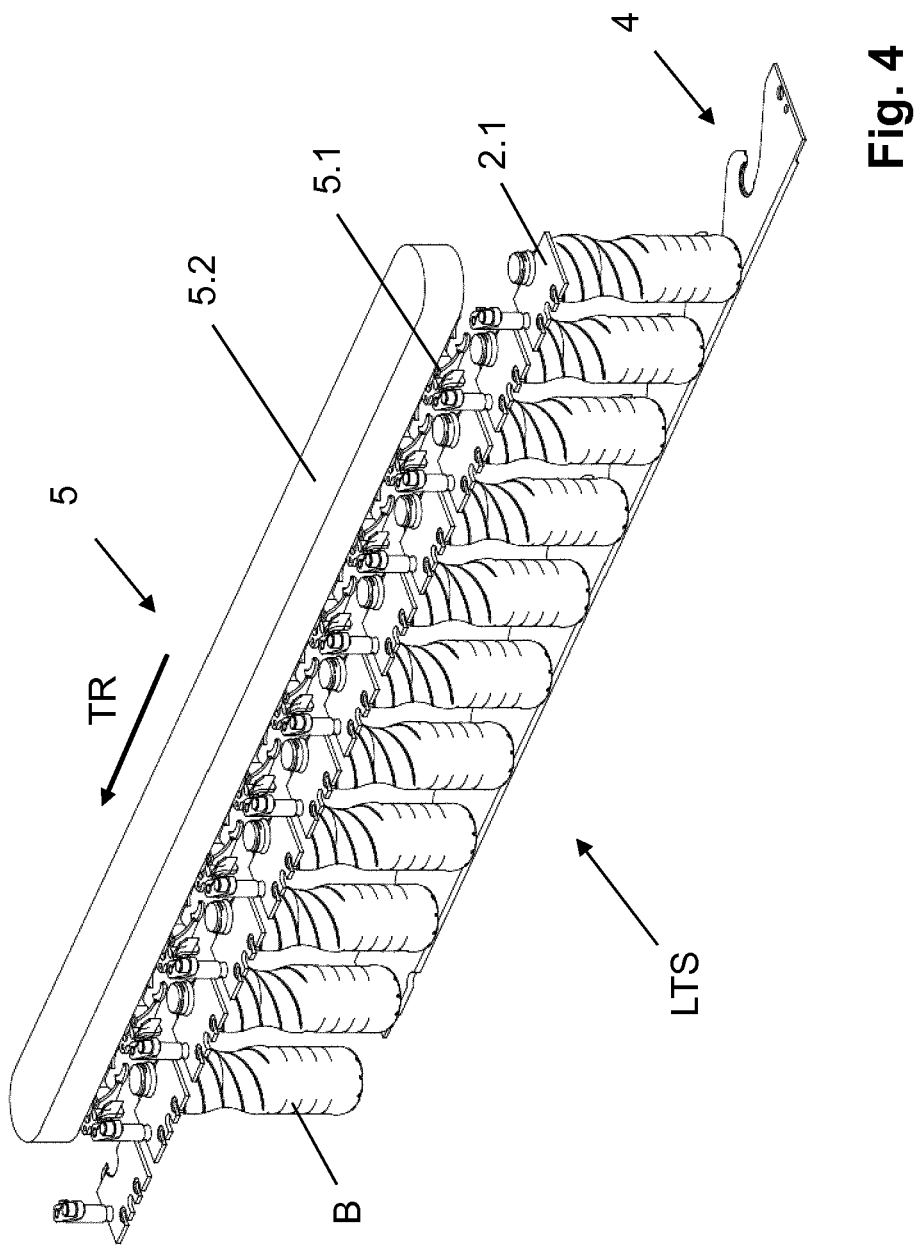
FIG. 4 is a perspective view of the transfer apparatus shown in FIG. 3.

As shown in FIG. 4, a common drive 5.2 causes all the grippers 5.1 to pivot together about their respective vertical axes DA. The opening axes GA of the grippers 5.1 are thus always parallel with each other.

The number of grippers 5.1 in the transfer apparatus 5 depends on how many containers are in a container group. In the illustrated embodiment, a group has ten containers. Consequently, there are ten grippers 5.1. However, the subject matter of the invention includes other numbers of grippers 5.1.

Figure 3:
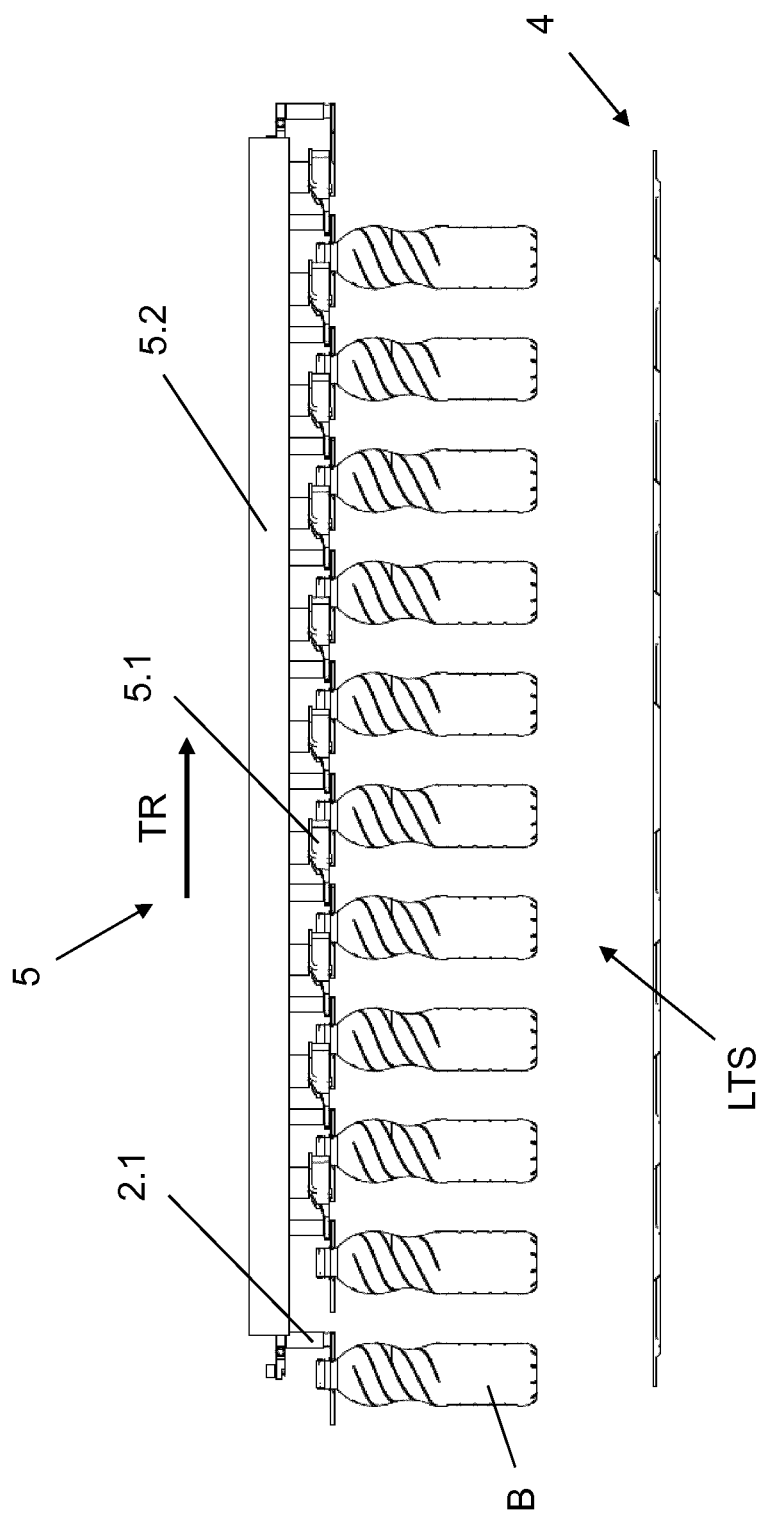
FIG. 3 is a side view of the transfer apparatus shown in FIG. 1 next to part of a cyclical take-up device.
Figure 5:
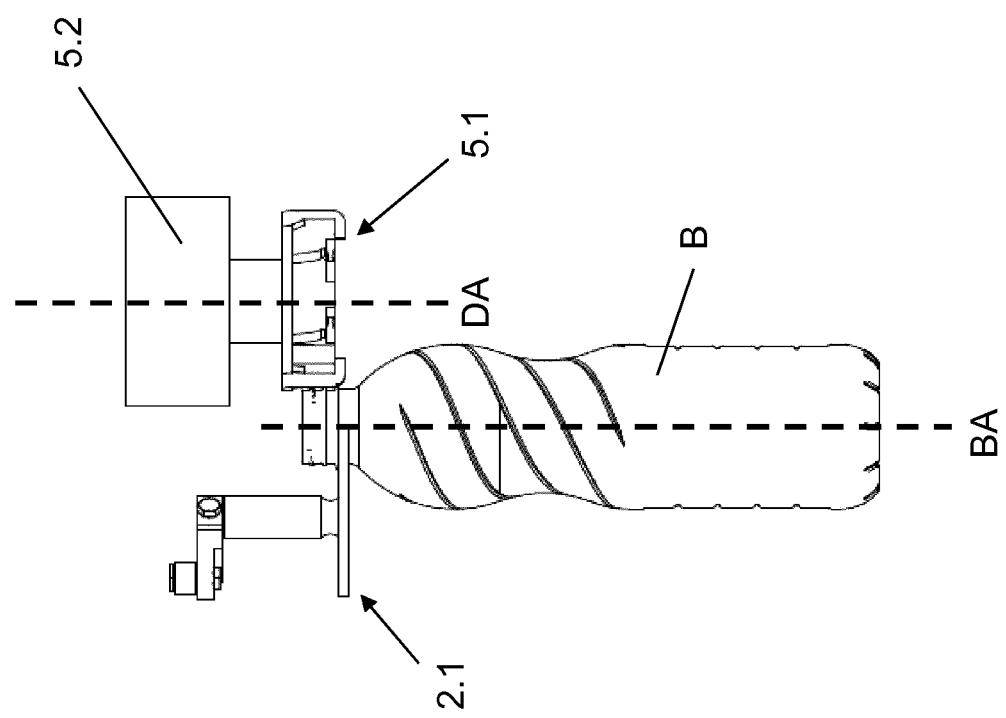
FIG. 5 is an end view of a gripper suspending a container.
Figure 6:
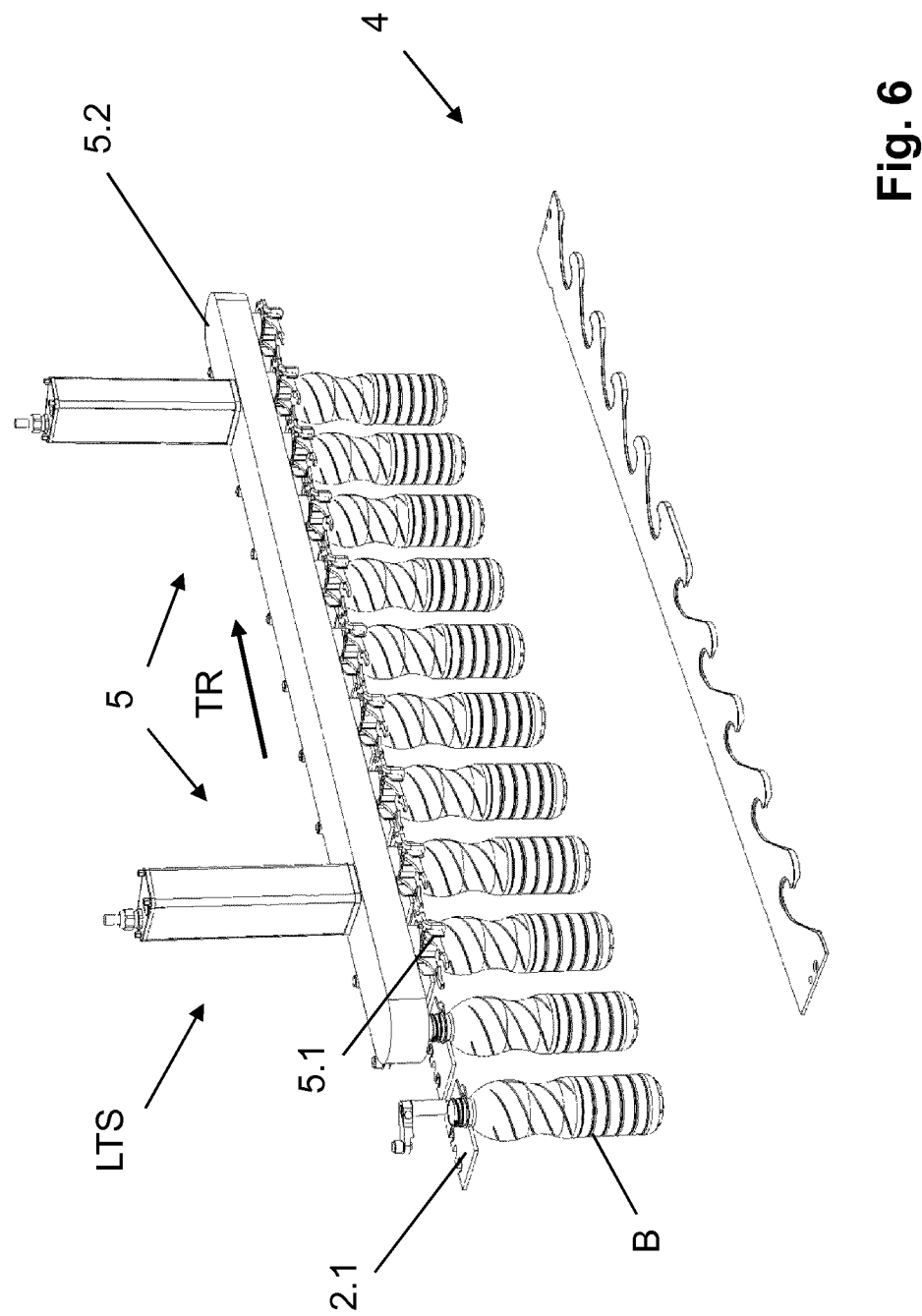
FIG. 6 is a perspective view of a transfer apparatus.

FIG. 3 shows a side view of the transfer apparatus 5 with the cyclical take-up device 4 arranged underneath it as it would be seen from the second linear section LTS. FIG. 4 shows a perspective view of the transfer apparatus 5 and FIG. 5 shows an end view of the transfer apparatus 5.

The transfer apparatus 5 takes up containers 5 on a group-by-group basis and transfers the containers B, as a group, to the cyclical take-up device 4, which is typically part of the processing machine 20.

The illustrated take-up device 4 is shown in simplified form as a carrier plate having as many cut-outs as there are containers B in a container group. Each cut-out is shaped to engage a container's neck ring. The carrier plate takes up a group of containers and processes them in the container-processing machine 20, for example by filling them.

To permit interference-free transfer, the gripper arms 5.1 and the sections of the carrying-and-holding element that engage the neck ring occupy planes that are vertically offset from each other. This configuration can be seen in FIG. 5, in which the gripper's arms 1 lie in a horizontal plane above the horizontal plane accommodating the gripping sections of the gripper 2.1. This makes it possible for the arms to pivot inwards into the continuous container stream without any interference.

FIGS. 7a-7f show six snapshots of the transfer apparatus 5 during the course of a transfer of a group of containers.

FIG. 7a shows the containers B moving continuously in the conveying direction TR along the second linear section LTS. Each carrying-and-holding element 2.1 of the intake device 2 holds a container by its neck ring. The container neck is taken up in a gripper take-up that opens outwards, i.e. in the direction of the conveying device 5. The container B can therefore be released in the direction of the transfer apparatus 5 by opening the carrier-and-holding element 2.1. The gripper's opening axis GA is oriented obliquely to the conveying direction TR. As a result, clockwise rotation of the gripper 5.1 about its vertical axis DA pivots the opening axis GA inwards.

Figure 7B:
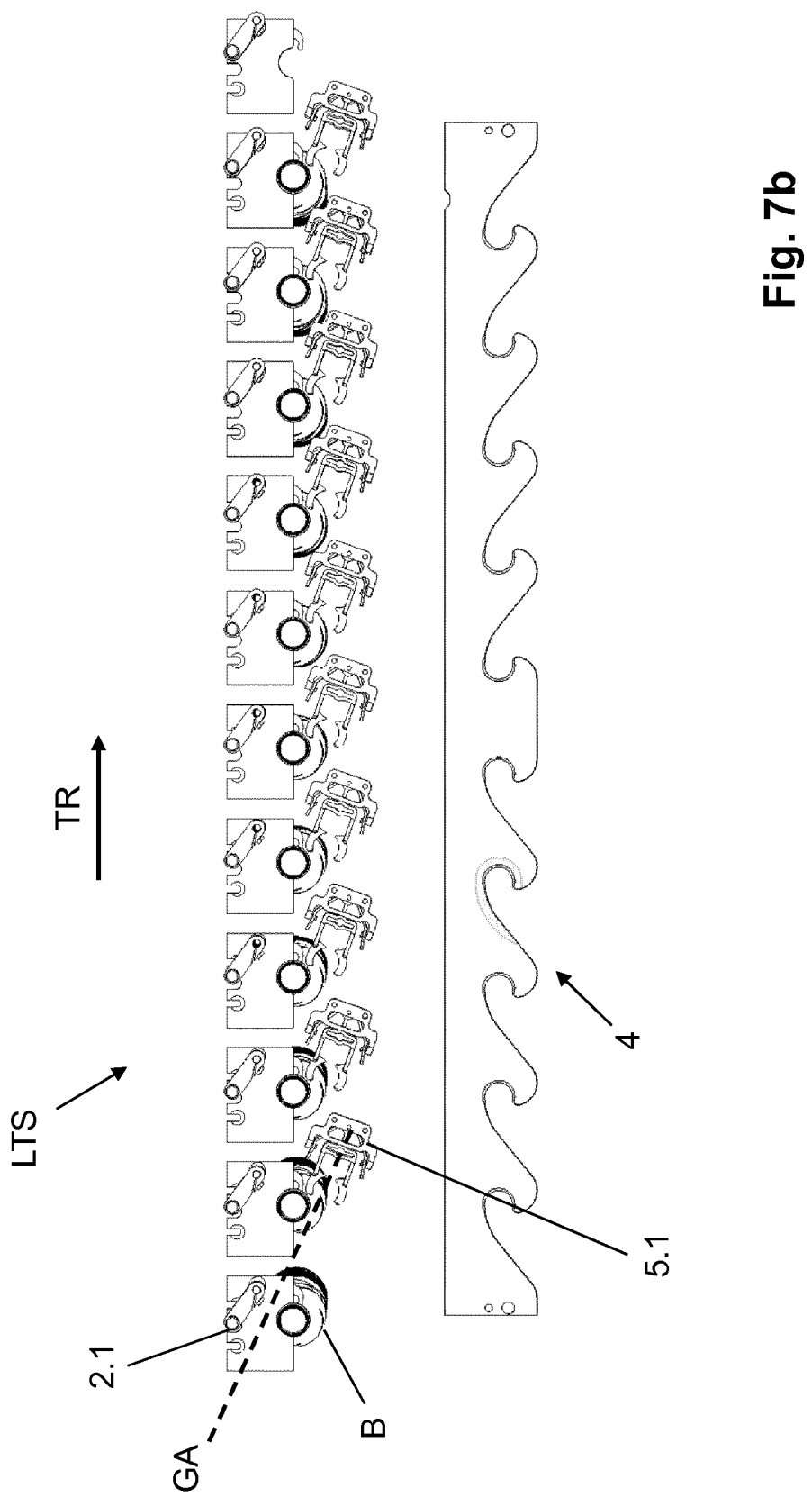

FIG. 7b shows the gripper 5.1 open and ready to receive an approaching container B. The gripper's opening axis GA lags the particular container B that the gripper 5.1 is aiming to catch. However, the drive 5.2 pivots the gripper 5.1 fast enough so that the gripper axis GA will catch up to the container B, as shown in FIG. 7c.

Figure 7C:
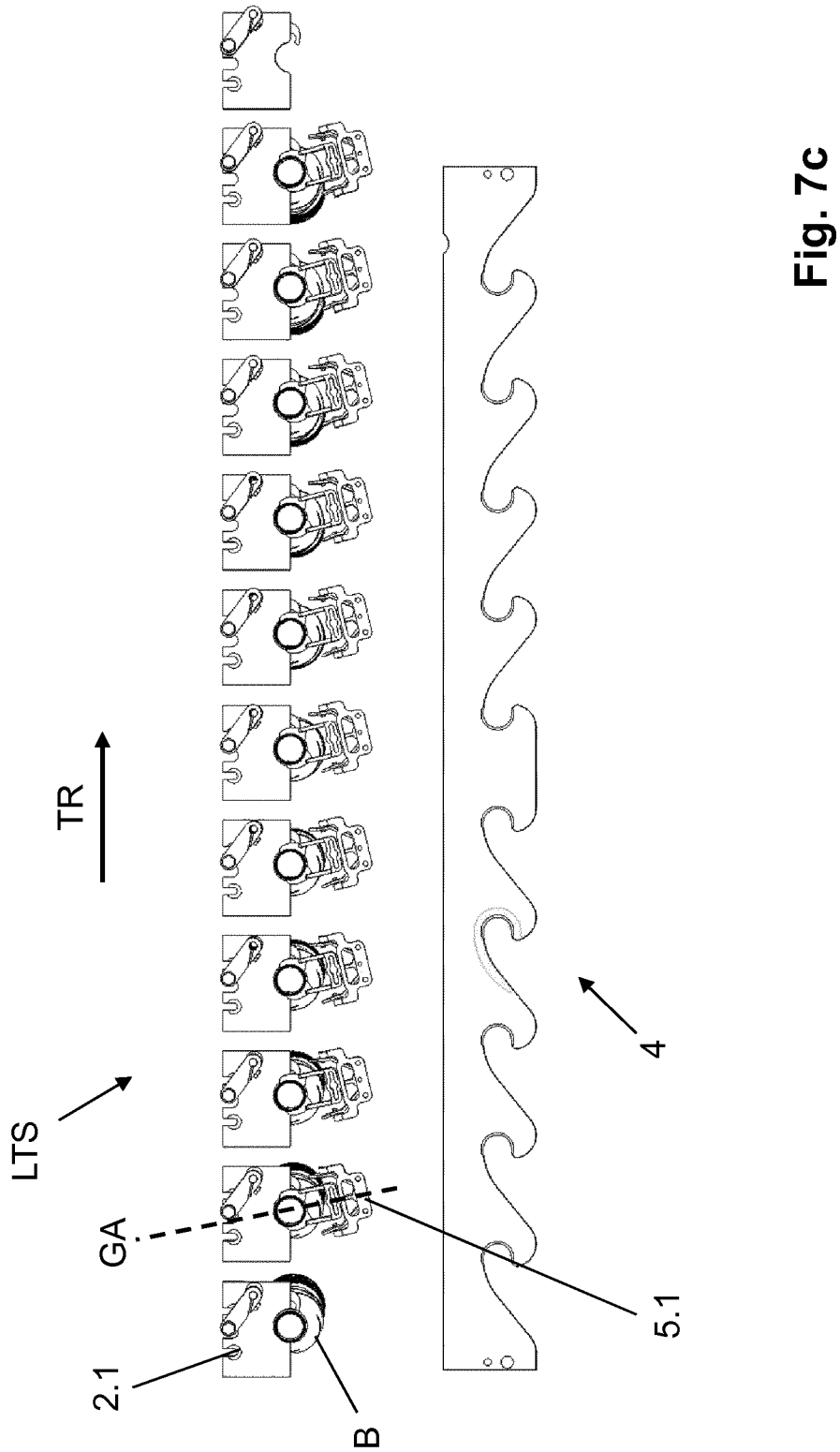

FIG. 7c shows the opening axis GA now perpendicular to the container's longitudinal axis BA. At this point, the gripper 5.1 is able to take up the container B.

Figure 7D:
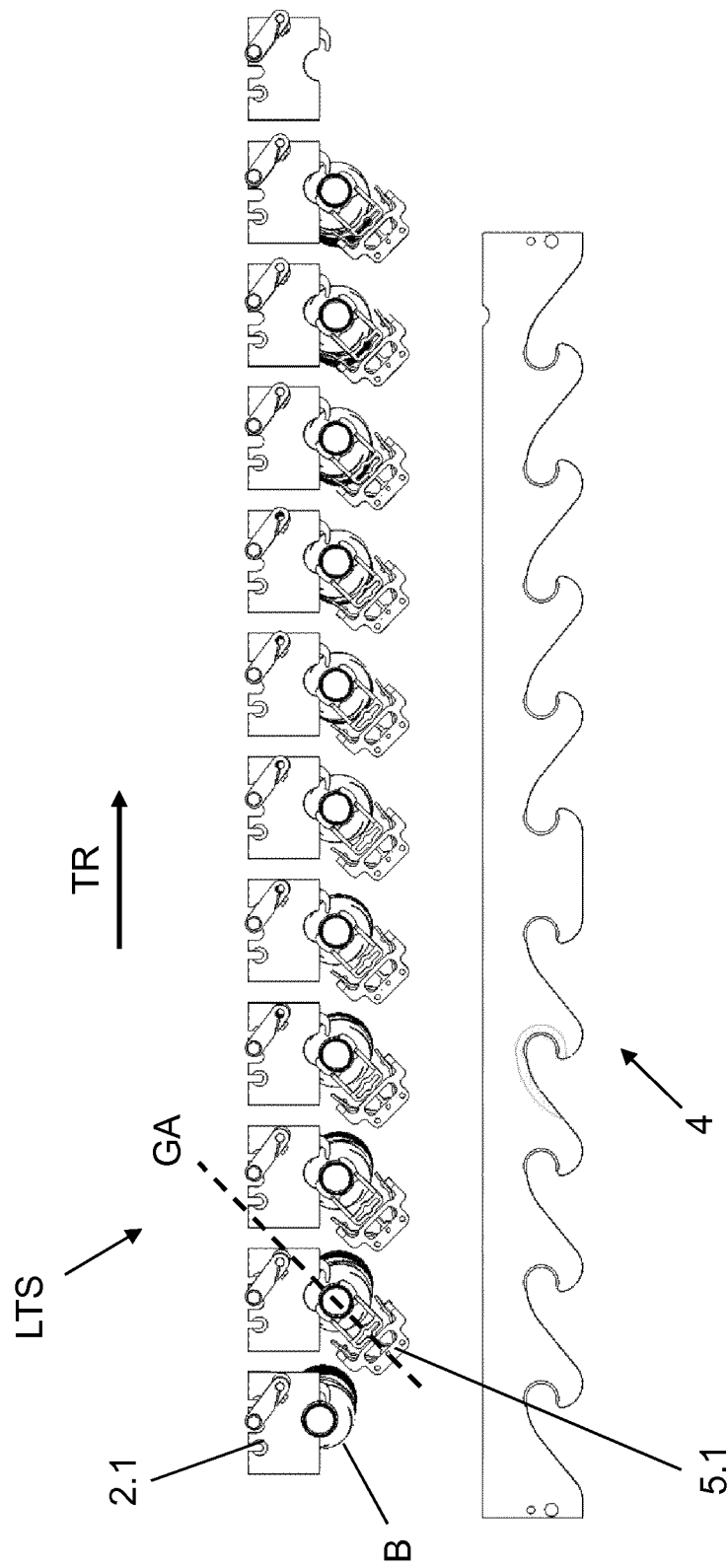

In FIG. 7d, the gripper 5.1 has taken up the container B. Meanwhile, the drive 5.2 continues to rotate the gripper 5.1 so that the opening axis GA continues its clockwise rotation.

In FIG. 7e, the gripper's continued rotation has cleared the container B from the second linear section LTS. The containers B are now oriented along a row with the opening axes GA of all the grippers 5.1 being colinear.

Figure 7F:
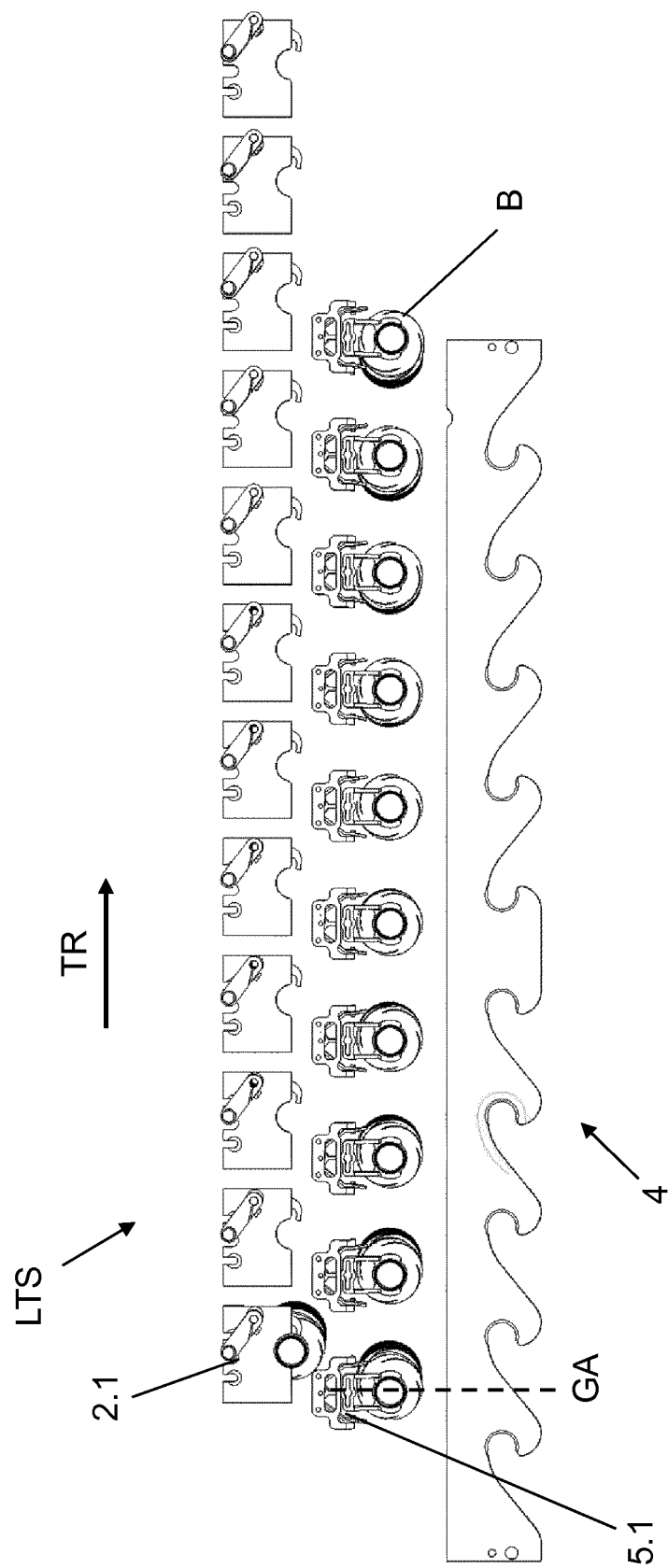

FIG. 7f shows the opening axes GA of the grippers 5.1 further rotated so that they are now parallel to each other and facing the take-up device 4.

During the handover of the container group from the transfer device 5 to the cyclical take-up device 4, more containers B keep coming. In fact, FIG. 7e shows that a leading container B has already arrived. However, with correct timing, it is possible to return the grippers 5.1 back to the position shown in FIG. 7a in time to take up the next group of containers B.

Figure 9:
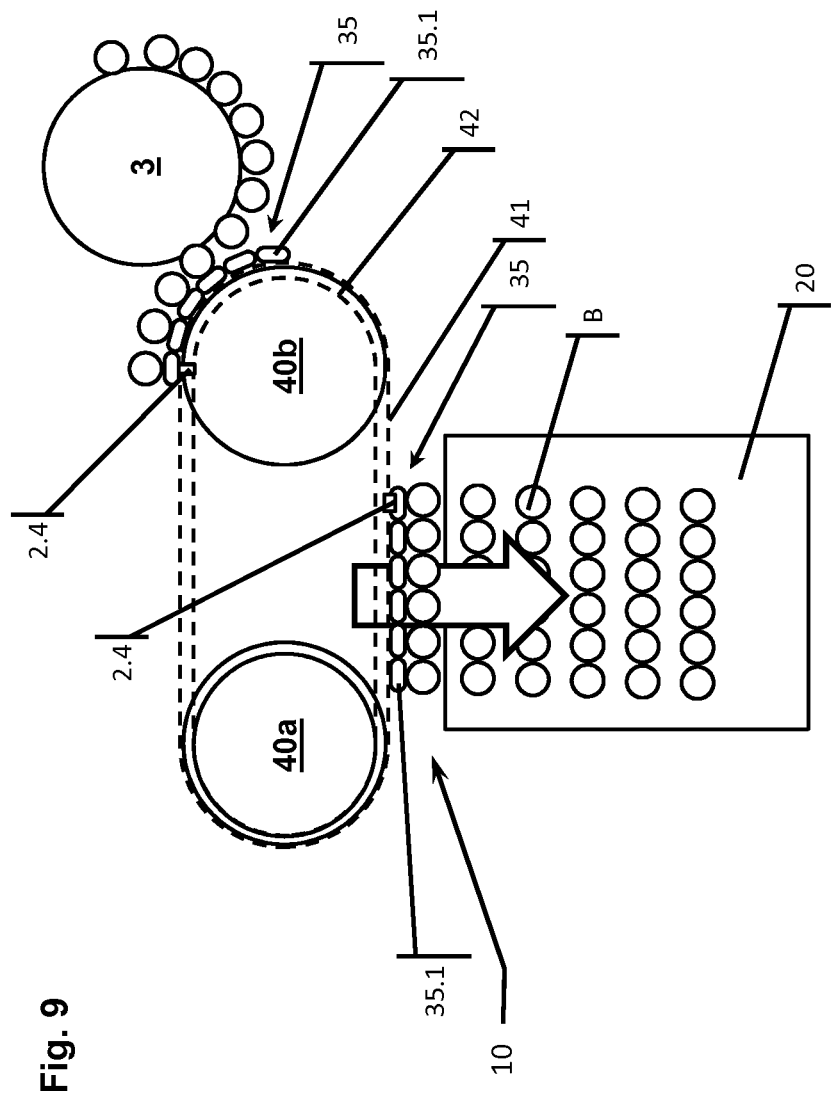
FIG. 9 shows an apparatus similar to that in FIG. 8 but with drawing modules coupled by endlessly circulating belts.

FIGS. 8 and 9 show embodiments in which the carrying-and-holding elements 2.1 are grouped.

In FIG. 9, carriages 35.1 are grouped to define a drawing module 35. Each carriage 35.1 carries a carrying-and-holding element 2.1. The number of carriages 35.1 matches the number of containers in a container group.

In the illustrated embodiment, the drawing module 35 includes a drive 36, such as a servomotor. This drive 36 pulls the drawing module 35 in a controlled manner in much the same way that a locomotive would pull a consist. Thus, a drawing module 35 with its own drive 36 can be accelerated independently of other drawing modules 35. For example, it is possible for the drive 36 to simply halt the drawing module 35 at a particular location, for example at the transfer region 10. In some embodiments, there are two or more drawing modules 35, each of which is driven by its own drive 36.

Some embodiments feature the conveyor rail 2.4 implemented as a toothed rail, much like a cog railway. In such embodiments, the drive 36 has a corresponding toothed wheel to engage the rail 2.4. In some embodiments, the drive unit 36 can also suspend a container, in which case the drive unit 36 is also a carrying-and-holding element 2.1.

Other embodiments rely on an electromagnetic linear drive. In such embodiments, the conveyor rail 2.3 functions as a stator. In such cases, either the drive unit 36 can have a magnet. Alternatively, each of the carriages 35.1 can have a magnet. As used herein, "magnet" refers to both permanent magnets and ferromagnetic components. In the latter case, the carriages are not coupled to each other and can therefore move independently.

In the embodiment shown in FIG. 9, the two drawing modules 35 are connected by corresponding belts 41, 42 to a servo drive 40a, 40b. In effect, the servo drive 40a, 40b takes the place of the drive unit 36 in FIG. 8. In the present example, the drawing module 35 located in the transfer region 10 connects to an outer belt 41 via a corresponding coupling element 2.4 and the other drawing module 35, which is at the intake's transfer region, connects to an inner belt 42 via a coupling 2.4. Since different servo drives 40*a*, 40*b* drive the different belts, the two drawing modules 35 operate independently of one another on the conveyor rail 2.3. The adjacent side in each case serves as a passive guide and deflector of the respective belt.

In an alternative embodiments, the belts 41, 42 are guided and driven on different height levels. In such cases, coupling elements are equipped such that an unobstructed drive of both belts can take place.

The foregoing embodiments are configurable to conform to other numbers of drawing modules 35 and corresponding drives. By mechanically coupling several servomotor units 40*a*, 40*b*, to the corresponding drawing modules 35, it has proven possible to operate as many as eight such drive modules 35 independently of one another in an intake device 2.

The drawing modules 35 and their carriages are able to continuously take-up containers B from the feed device 3. The containers B of a group of containers that have been taken up by a respective drawing module 35 are conveyed in a controlled manner by the associated drive unit or servomotor unit to the transfer region 10. Once there, they are taken off or taken up cyclically by the take-up device 4. The newly-emptied drawing module 35 or carriage is then conveyed back to the feed device 3, to take up containers B from there.

In general the principle applies to this device and method, with all their embodiments, that ideally the containers are held suspended from the feed device as far as the transfer and take-up at the take-up device of the cyclical processing machine, for which purpose they can be gripped, held, and/or carried in the region of the container neck or a neck ring (above or below) by a clamp or a gripper.

The invention had been described heretofore by way of exemplary embodiments. It is understood that numerous modifications and derivations are possible without thereby departing from the inventive concept underlying the invention.

The invention claimed is:

1. An apparatus for grouped take-up and feeding of a group of containers to a cyclical processing machine having a cyclical take-up device for taking up said group of containers, said apparatus comprising an intake, a feed, and a transfer apparatus that is arranged in a transfer region between said intake and said take-up device, wherein said intake forms a closed conveyor section that comprises a linear section and comprises a conveyor and carrying-and-holding elements, wherein said carrying-and-holding elements cooperate to convey containers in a continuous container stream along said conveyor section, wherein said feed uses mechanical propulsion to convey suspended containers to individually transfer said suspended containers to said carrying-and-holding elements, wherein said transfer apparatus comprises grippers for simultaneously taking up a group of containers from said continuous container stream at said linear section and after having taken up said group of containers, feeding said group of containers to said cyclical take-up device, and wherein each of said grippers rotates about a vertical axis-of-rotation thereof.

2. The apparatus of claim 1, wherein each of said grippers is configured to grip a container at or above a container neck thereof.

3. The apparatus of claim 1, wherein said grippers are configured to pivot about their respective vertical axes-of-rotation in synchrony with one another.

4. The apparatus of claim 1, wherein said grippers are rotated to match movement of containers along said linear section.

5. The apparatus of claim 1, wherein said grippers of said transfer apparatus are arranged to remain along a line that is parallel to and at a distance from said linear section, wherein each gripper of said transfer apparatus takes up a container from a corresponding gripper on said intake.

6. The apparatus of claim 1, wherein said transfer apparatus comprises a common drive that drives all of said grippers to cause all of said grippers to rotate together.

7. The apparatus of claim 1, wherein each gripper comprises two mutually opposed gripper arms, each of which has a free-end region, wherein said free-end regions enclose a gripper opening for introducing and holding a neck of container between said two gripper arms.

8. The apparatus of claim 1, wherein each of said grippers has a gripper-opening axis that extends from its vertical axis-of-rotation in a direction that is perpendicular to said vertical axis-of-rotation and passes between mutually-opposed gripper arms of said gripper, said gripper arms having free ends that define an opening for engaging a container's neck.

9. The apparatus of claim 1, further comprising a circulating conveyor that holds said carrying-and-holding elements such that said carrying-and-holding elements face laterally outwards from said conveyor section and project from said conveyor section.

10. The apparatus of claim 9, wherein said conveyor comprises carriage elements and a conveyor chain having chain links, and wherein said carrying-and-holding elements are secured to said chain links.

11. The apparatus of claim 9, wherein said conveyor comprises carriage elements and a conveyor rail, and wherein said carrying-and-holding elements are secured to said carriage elements respectively.

12. The apparatus of claim 9, wherein said conveyor comprises a rail and a plurality of drawing modules, wherein each of said drawing modules comprises a drive, and wherein said drive is a controllable servomotor that propels said drawing module along said rail.

13. The apparatus of claim 9, wherein said conveyor comprises a conveyor rail and a plurality of drawing modules, wherein each drawing module has an assigned electromagnetic drive unit, wherein each drawing module comprises carriages, each of which has a magnetic structure selected from the group consisting of a permanent magnet and a ferromagnetic material, and wherein said electromagnetic drive unit causes said drawing module to move along said conveyor rail independently of all other drawing modules.

14. The apparatus of claim 1, wherein said conveyor comprises a drawing module that comprises as many carrying-and-holding elements as there are containers in said group of containers and wherein said drawing module moves said carrying-and-holding elements as a unit.

15. The apparatus of claim 1, wherein said suspended containers are suspended from neck rings thereof.

16. The apparatus of claim 1, wherein each gripper comprises arms that lie in a first horizontal plane and each carrying-and-holding element suspends a container from a second horizontal plane that is vertically offset from the first horizontal plane thereby enabling said gripper to execute an interference-free pivot inward into said continuous container stream.

17. The apparatus of claim 1, wherein each gripper comprises an opening axis that is perpendicular to said gripper's vertical axis-of-rotation, wherein rotating said gripper causes said opening axis to transition from lagging behind a container that is to be gripped by said gripper to catching up to said container.

18. A method for using an apparatus for grouped take-up and feeding of a group of containers to a cyclical processing machine having a cyclical take-up device for taking up said group of containers, said apparatus comprising an intake, a feed, and a transfer apparatus that is arranged in a transfer region between said intake and said take-up device, wherein said intake forms a closed conveyor section that comprises a linear section and comprises a conveyor and carrying-and-holding elements, causing said carrying-and-holding elements to convey containers in a continuous container stream along said conveyor section, causing said feed to mechanically propel suspended containers to individually transfer said suspended containers to said carrying-and-holding elements, causing grippers of said transfer apparatus to rotate as said grippers simultaneously take up a group of containers from said continuous container stream at said linear section, and after said grippers have taken up said group of containers, causing said grippers to rotate to feed said group of containers to said cyclical take-up device, wherein causing a gripper to rotate comprises causing said gripper to rotate about a vertical axis-of-rotation of said gripper.

19. The method of claim 18, wherein causing said grippers to rotate about vertical axes-of-rotation thereof comprises causing all of said grippers to rotate about their respective vertical axes-of-rotation together by the same amount.

20. The method of claim 18, further comprising causing said carrying-and-holding elements to move continuously along said closed conveyor section while said grippers rotate about their respective vertical axes-of-rotation.

* * * * *